United States Patent
Heertjes et al.

(10) Patent No.: US 11,454,938 B2
(45) Date of Patent: Sep. 27, 2022

(54) CONTROL SYSTEM, METHOD TO INCREASE A BANDWIDTH OF A CONTROL SYSTEM, AND LITHOGRAPHIC APPARATUS

(71) Applicant: ASML Netherlands B.V., Veldhoven (NL)

(72) Inventors: Marcel François Heertjes, Best (NL); Daniel Andreas Deenen, Eindhoven (NL); Natalia Irigoyen Perdiguero, Eindhoven (NL); Yannick Knops, Eindhoven (NL)

(73) Assignee: ASML Netherlands B.V., Veldhoven (NL)

( * ) Notice: Subject to any disclaimer, the term of this patent is extended or adjusted under 35 U.S.C. 154(b) by 286 days.

(21) Appl. No.: 16/615,632

(22) PCT Filed: Apr. 23, 2018

(86) PCT No.: PCT/EP2018/060323
§ 371 (c)(1),
(2) Date: Nov. 21, 2019

(87) PCT Pub. No.: WO2018/215153
PCT Pub. Date: Nov. 29, 2018

(65) Prior Publication Data
US 2020/0174428 A1   Jun. 4, 2020

(30) Foreign Application Priority Data
May 22, 2017   (EP) .................................... 17172257

(51) Int. Cl.
*G05B 13/02* (2006.01)
*G05B 19/4155* (2006.01)
(52) U.S. Cl.
CPC ....... *G05B 13/021* (2013.01); *G05B 19/4155* (2013.01); *G05B 2219/45028* (2013.01)

(58) Field of Classification Search
CPC .............. G05B 13/021; G05B 19/4155; G05B 2219/45028; G05B 11/42; G05B 13/02; G05B 11/36; G03F 7/20
See application file for complete search history.

(56) References Cited

U.S. PATENT DOCUMENTS

| 4,283,670 A | * | 8/1981 | Durand | G05B 11/42 |
| | | | | 318/591 |
| 5,298,845 A | * | 3/1994 | DeBoer | G05B 11/42 |
| | | | | 318/609 |

(Continued)

FOREIGN PATENT DOCUMENTS

| CA | 2235104 C | 11/2000 |
| GB | 2545057 A | 6/2017 |

(Continued)

OTHER PUBLICATIONS

International Search Report and Written Opinion of the International Searching Authority directed to related International Patent Application No. PCT/EP2018/060323, dated Jul. 17, 2018; 9 pages.

(Continued)

*Primary Examiner* — Kenneth M Lo
*Assistant Examiner* — Jonathan Michael Skrzycki
(74) *Attorney, Agent, or Firm* — Sterne, Kessler, Goldstein & Fox P.L.L.C.

(57) ABSTRACT

The invention relates to a control system comprising a controller arranged to provide an output signal on the basis of an input signal. The controller comprises a linear integrator, a linear gain and a selector. The linear integrator is arranged to provide a first control signal. The linear gain is in parallel to the linear integrator and is arranged to provide a second control signal. The selector is arranged to switch between an integrator mode in which the first control signal is used as the output signal of the controller and a gain mode in which the second control signal is used as the output (Continued)

signal of the controller. The selector is arranged to switch to the integrator mode when the value of the second control signal passes zero, and to switch to the gain mode when: $eu<k_h^{-1}u^2$, wherein e is the input signal of the controller, u is the output signal of the controller, and $k_h$ is the gain of the linear gain.

15 Claims, 4 Drawing Sheets

(56) References Cited

U.S. PATENT DOCUMENTS

2006/0012344 A1    1/2006  Velhner et al.
2009/0198351 A1    8/2009  Kitagawa
2010/0141198 A1    6/2010  Krah
2014/0111132 A1*   4/2014  Youm ................ G05B 13/044
                                                          318/561

FOREIGN PATENT DOCUMENTS

JP    2009-186685 A    8/2009
JP    2010-528385 A    8/2010

OTHER PUBLICATIONS

International Preliminary Report on Patentability directed to related International Patent Application No. PCT/EP2018/060323, dated Nov. 26, 2019; 7 pages.

* cited by examiner

CONTROL SYSTEM, METHOD TO INCREASE A BANDWIDTH OF A CONTROL SYSTEM, AND LITHOGRAPHIC APPARATUS

CROSS-REFERENCE TO RELATED APPLICATIONS

This application claims priority of EP application 17172257.2 which was filed on 22 May 2017 and which is incorporated herein in its entirety by reference.

FIELD OF THE INVENTION

The present invention relates to a control system, a method to increase a bandwidth of a control system, and a lithographic apparatus comprising such control system.

BACKGROUND ART

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, may be used to generate a circuit pattern to be formed on an individual layer of the IC. This pattern can be transferred onto a target portion (e.g. comprising part of, one, or several dies) on a substrate (e.g. a silicon wafer). Transfer of the pattern is typically via imaging onto a layer of radiation-sensitive material (resist) provided on the substrate. In general, a single substrate will contain a network of adjacent target portions that are successively patterned. Known lithographic apparatus include so-called steppers, in which each target portion is irradiated by exposing an entire pattern onto the target portion at one time, and so-called scanners, in which each target portion is irradiated by scanning the pattern through a radiation beam in a given direction (the "scanning"-direction) while synchronously scanning the substrate parallel or anti-parallel to this direction. It is also possible to transfer the pattern from the patterning device to the substrate by imprinting the pattern onto the substrate.

In a lithographic apparatus, control systems are used to control a variable of the lithographic apparatus. In many of these control systems linear integrators are applied. Examples of control systems in which linear integrators are applied are for example position or speed control systems for stages and/or lenses, position control systems for substrate handlers, control systems to control thermal conditions of the lithographic apparatus, etc.

Linear integrators are known to provide a good low-frequency disturbance rejection. Furthermore, the linear behavior of linear integrators is predictable with respect to performance and stability.

However, all linear integrators abide Bode's gain-phase relationship, i.e. a minus 20 dB per decade amplitude slope with a 90 degrees phase lag. This 90 degrees phase lag typically forms a limitation to increase the bandwidth of the control system. This limitation on the bandwidth is generally undesirable.

SUMMARY OF THE INVENTION

It is an object of the invention to provide a control system having a linear integrator that may provide improved control characteristics. It is in particular an object of the invention to provide a control system that allows to apply the low-frequency disturbance rejection of the linear integrator, but that at the same time allows for an improved bandwidth with respect to the bandwidth of the linear integrator.

According to an aspect of the invention, there is provided a control system, comprising: a controller arranged to provide an output signal on the basis of an input signal, the controller comprising:
a linear integrator arranged to provide a first control signal,
a linear gain in parallel to the linear integrator and arranged to provide a second control signal, and
a selector arranged to switch between an integrator mode in which the first control signal is used as the output signal of the controller and a gain mode in which the second control signal is used as the output signal of the controller, wherein the selector is arranged to:
switch to the integrator mode when the value of the second control signal passes zero, and
switch to the gain mode when:

$$eu < k_h^{-1} u^2,$$

wherein e is the input signal of the controller, u is the output signal of the controller, and $k_h$ is the gain of the linear gain.

According to an aspect of the invention, there is provided a method to increase a bandwidth of a control system providing an output signal on the basis of an input signal, the control system comprising a linear integrator and a linear gain parallel to the linear integrator, wherein the linear integrator is arranged to provide a first control signal and wherein the linear gain is arranged to provide a second control signal, the method comprising the steps of:
switching to an integrator mode when the value of the second control signal passes zero, and
switching to the gain mode when:

$$eu < k_h^{-1} u^2,$$

wherein e is the input signal of the controller, u is the output signal of the controller, and $k_h$ is a gain of the linear gain, and
wherein in the integrator mode the first control signal is used as the output signal, and
wherein in the gain mode the second control signal is used as the output signal.

According to an aspect of the invention, there is provided a lithographic apparatus comprising:
a support constructed to support a patterning device, the patterning device being capable of imparting the radiation beam with a pattern in its cross-section to form a patterned radiation beam;
a substrate table constructed to hold a substrate;
a projection system configured to project the patterned radiation beam onto a target portion of the substrate;
wherein the lithographic apparatus comprises the control system according to an aspect of the invention to control a variable of the lithographic apparatus According to an aspect of the invention there is provided a method to increase a bandwidth of a controller providing an output signal on the basis of an input signal, the controller comprising a linear integrator and a linear gain parallel to the linear integrator, wherein the linear integrator is arranged to provide a first control signal, wherein the linear gain is arranged to provide a second control signal, the method comprising the steps of:
selecting the first control signal as the output signal of the controller when the value of the second control signal passes zero, and switching to the second control signal as the output signal of the controller when an absolute value of the first control signal is the same or larger than an absolute value of the second control signal.

BRIEF DESCRIPTION OF THE DRAWINGS

Embodiments of the invention will now be described, by way of example only, with reference to the accompanying schematic drawings in which corresponding reference symbols indicate corresponding parts, and in which.

DETAILED DESCRIPTION

Figure 1:
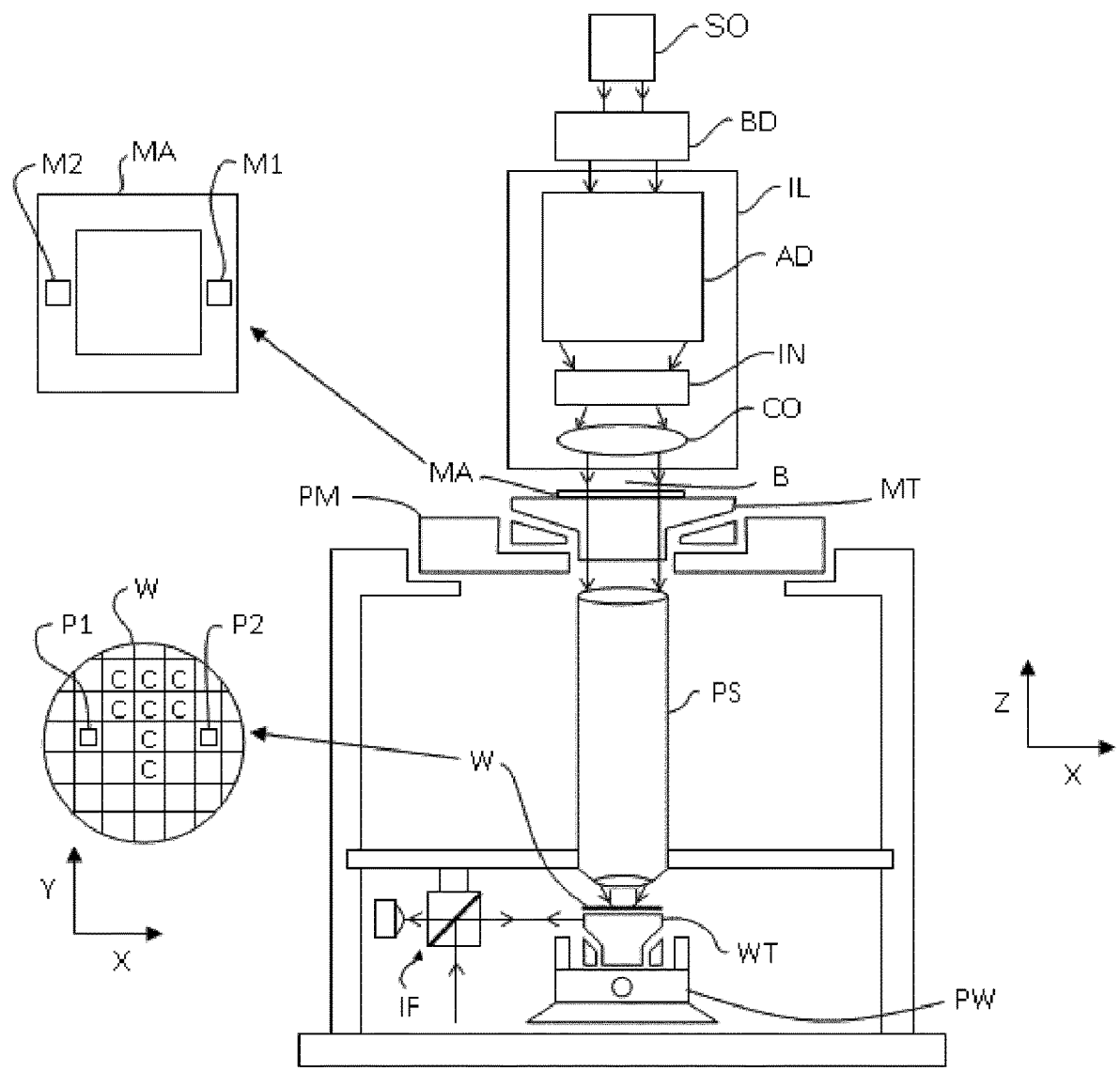
FIG. 1 depicts a lithographic apparatus in which embodiments of the invention may be provided.

FIG. 1 schematically depicts a lithographic apparatus according to one embodiment of the invention. The apparatus comprises an illumination system IL, a support structure MT, a substrate table WT and a projection system PS.

The illumination system IL is configured to condition a radiation beam B. The support structure MT (e.g. a mask table) is constructed to support a patterning device MA (e.g. a mask) and connected to a first positioner PM configured to accurately position the patterning device in accordance with certain parameters. The substrate table WT (e.g. a wafer table) is constructed to hold a substrate W (e.g. a resist-coated wafer) W and connected to a second positioner PW configured to accurately position the substrate in accordance with certain parameters. The projection system PS is configured to project a pattern imparted to the radiation beam B by patterning device MA onto a target portion C (e.g. comprising one or more dies) of the substrate W.

The illumination system IL may include various types of optical components, such as refractive, reflective, magnetic, electromagnetic, electrostatic or other types of optical components, or any combination thereof, for directing, shaping, or controlling radiation.

The term "radiation beam" used herein encompass all types of electromagnetic radiation, including ultraviolet (UV) radiation (e.g. having a wavelength of or about 365, 355, 248, 193, 157 or 126 nm) and extreme ultra-violet (EUV) radiation (e.g. having a wavelength in the range of 5-20 nm), as well as particle beams, such as ion beams or electron beams.

The support structure MT supports, i.e. bears the weight of, the patterning device MA. The support structure MT holds the patterning device MA in a manner that depends on the orientation of the patterning device MA, the design of the lithographic apparatus, and other conditions, such as for example whether or not the patterning device MA is held in a vacuum environment. The support structure MT can use mechanical, vacuum, electrostatic or other clamping techniques to hold the patterning device MA. The support structure MT may be a frame or a table, for example, which may be fixed or movable as required. The support structure MT may ensure that the patterning device MA is at a desired position, for example with respect to the projection system PS.

The term "patterning device" used herein should be broadly interpreted as referring to any device that can be used to impart a radiation beam B with a pattern in its cross-section such as to create a pattern in a target portion C of the substrate W. It should be noted that the pattern imparted to the radiation beam B may not exactly correspond to the desired pattern in the target portion C of the substrate W, for example if the pattern includes phase-shifting features or so called assist features. Generally, the pattern imparted to the radiation beam will correspond to a particular functional layer in a device being created in the target portion C, such as an integrated circuit.

The patterning device MA may be transmissive or reflective. Examples of patterning devices include masks, programmable mirror arrays, and programmable LCD panels. Masks are well known in lithography, and include mask types such as binary, alternating phase-shift, and attenuated phase-shift, as well as various hybrid mask types. An example of a programmable mirror array employs a matrix arrangement of small mirrors, each of which can be individually tilted so as to reflect an incoming radiation beam B in different directions. The tilted mirrors impart a pattern in a radiation beam B which is reflected by the mirror matrix.

The term "projection system" used herein should be broadly interpreted as encompassing any type of projection system, including refractive, reflective, catadioptric, magnetic, electromagnetic and electrostatic optical systems, or any combination thereof, as appropriate for the exposure radiation being used, or for other factors such as the use of an immersion liquid or the use of a vacuum.

As here depicted, the apparatus is of a transmissive type (e.g. employing a transmissive mask). Alternatively, the apparatus may be of a reflective type (e.g. employing a programmable mirror array of a type as referred to above, or employing a reflective mask).

The lithographic apparatus may be of a type having two (dual stage) or more substrate tables WT (and/or two or more mask tables). In such "multiple stage" machines the additional tables may be used in parallel, or preparatory steps may be carried out on one or more tables while one or more other tables are being used for exposure. In addition to one or more substrate tables WT, the lithographic apparatus may have a measurement stage that is arranged to be at a position beneath the projection system PS when the substrate table WT is away from that position. Instead of supporting a substrate W, the measurement stage may be provided with sensors to measure properties of the lithographic apparatus. For example, the projection system may project an image on a sensor on the measurement stage to determine an image quality.

The lithographic apparatus may also be of a type wherein at least a portion of the substrate W may be covered by a liquid having a relatively high refractive index, e.g. water, so as to fill a space between the projection system and the substrate. An immersion liquid may also be applied to other spaces in the lithographic apparatus, for example, between the patterning device MA and the projection system PS Immersion techniques are well known in the art for increasing the numerical aperture of projection systems. The term "immersion" as used herein does not mean that a structure, such as a substrate W, must be submerged in liquid, but rather only means that liquid is located between the projection system PS and the substrate W during exposure.

Referring to FIG. 1, the illumination system IL receives a radiation beam B from a radiation source SO. The radiation source SO and the lithographic apparatus may be separate entities, for example when the radiation source SO is an excimer laser. In such cases, the source is not considered to form part of the lithographic apparatus and the radiation beam B is passed from the radiation source SO to the illumination system IL with the aid of a beam delivery system BD comprising, for example, suitable directing mirrors and/or a beam expander. In other cases the radiation source SO may be an integral part of the lithographic apparatus, for example when the radiation source SO is a mercury lamp. The radiation source SO and the illuminator IL, together with the beam delivery system BD if required, may be referred to as a radiation system.

The illumination system IL may comprise an adjuster AD for adjusting the angular intensity distribution of the radiation beam B. Generally, at least the outer and/or inner radial extent (commonly referred to as σ-outer and σ-inner, respectively) of the intensity distribution in a pupil plane of the illumination system can be adjusted. In addition, the illumination system IL may comprise various other components, such as an integrator IN and a condenser CO. The illumination system IL may be used to condition the radiation beam B, to have a desired uniformity and intensity distribution in its cross-section.

The radiation beam B is incident on the patterning device MT, which is held on the support structure MT, and is patterned by the patterning device MA. Having traversed the patterning device MA, the radiation beam B passes through the projection system PS, which focuses the beam onto a target portion C of the substrate W. With the aid of the second positioner PW and position sensor IF (e.g. an interferometric device, linear encoder or capacitive sensor), the substrate table WT can be moved accurately, e.g. so as to position different target portions C in the path of the radiation beam B. Similarly, the first positioner PM and another position sensor (which is not explicitly depicted in FIG. 1) can be used to accurately position the patterning device MA with respect to the path of the radiation beam B, e.g. after mechanical retrieval from a mask library, or during a scan. In general, movement of the support structure MT may be realized with the aid of a long-stroke module and a short-stroke module, which form part of the first positioner PM. The long-stroke module may provide coarse positioning of the short-stroke module over a large range of movement. The short-stroke module may provide fine positioning of the support structure MT relative to the long-stroke module over a small range of movement. Similarly, movement of the substrate table WT may be realized using a long-stroke module and a short-stroke module, which form part of the second positioner PW. The long-stroke module may provide coarse positioning of the short-stroke module over a large range of movement. The short-stroke module may provide fine positioning of the substrate table WT relative to the long-stroke module over a small range of movement. In the case of a stepper (as opposed to a scanner) the support structure MT may be connected to a short-stroke actuator only, or may be fixed. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions C (these are known as scribe-lane alignment marks). Similarly, in situations in which more than one die is provided on the patterning device MA, the mask alignment marks M1, M2 may be located between the dies.

The depicted apparatus could be used in at least one of the following modes:

In a first mode, the so-called step mode, the support structure MT and the substrate table WT are kept essentially stationary, while an entire pattern imparted to the radiation beam B is projected onto a target portion C at one time (i.e. a single static exposure). The substrate table WT is then shifted in the X and/or Y direction so that a different target portion C can be exposed. In step mode, the maximum size of the exposure field limits the size of the target portion C imaged in a single static exposure.

In a second mode, the so-called scan mode, the support structure MT and the substrate table WT are scanned synchronously while a pattern imparted to the radiation beam B is projected onto a target portion C (i.e. a single dynamic exposure). The velocity and direction of the substrate table WT relative to the support structure MT may be determined by the (de-)magnification and image reversal characteristics of the projection system PS. In scan mode, the maximum size of the exposure field limits the width (in the non-scanning direction) of the target portion in a single dynamic exposure, whereas the length of the scanning motion determines the height (in the scanning direction) of the target portion.

In a third mode, the support structure MT is kept essentially stationary holding a programmable patterning device, and the substrate table WT is moved or scanned while a pattern imparted to the radiation beam B is projected onto a target portion C. In this mode, generally a pulsed radiation source is employed and the programmable patterning device is updated as required after each movement of the substrate table WT or in between successive radiation pulses during a scan. This mode of operation can be readily applied to maskless lithography that utilizes programmable patterning device, such as a programmable mirror array of a type as referred to above.

Combinations and/or variations on the above described modes of use or entirely different modes of use may also be employed.

Figure 2:
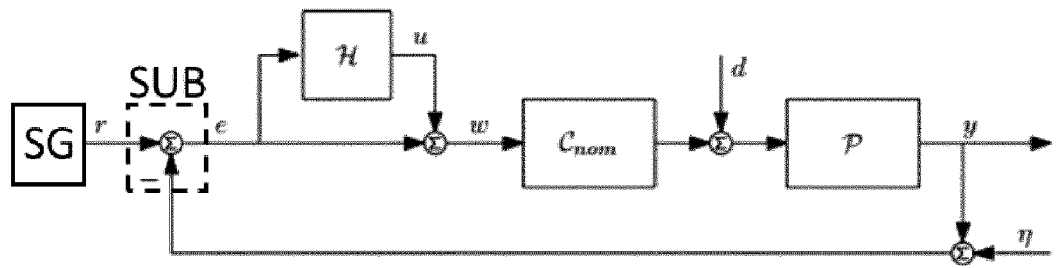
FIG. 2 shows schematically a control system according to the invention.

FIG. 2 shows a control scheme of a control system according to an embodiment of the invention. The control system is provided to control a variable of a plant P having an actual output value y. The actual output value y of the variable of the plant P to be controlled is measured by a measurement system, introducing some measurement noise η. The control system may for example be a position control system or speed control system for a stage and/or lens of a lithographic apparatus, a position control system for a substrate handler, a stage position system, a radiation source system, a control system to control thermal conditions of a lithographic apparatus.

The control system comprises a signal generator SG to provide a reference signal r. The reference signal r typically represents a desired value of the variable that is controlled by the control system. In a subtractor SUB, the actual output value y of the variable of the plant P to be controlled is subtracted from the reference signal r to provide an error signal e.

The error signal is fed as an input signal into a first controller H. The first controller H provides an output signal u. The output signal u is added to the error signal e to provide a signal w. The signal w is fed into a second controller $C_{nom}$, for instance a linear time invariant controller. The output of the second controller $C_{nom}$ is used as input for the plant P.

In accordance with the present invention, the controller H comprises a linear integrator L-I, a linear gain L-G and a selector SEL.

Figure 3:
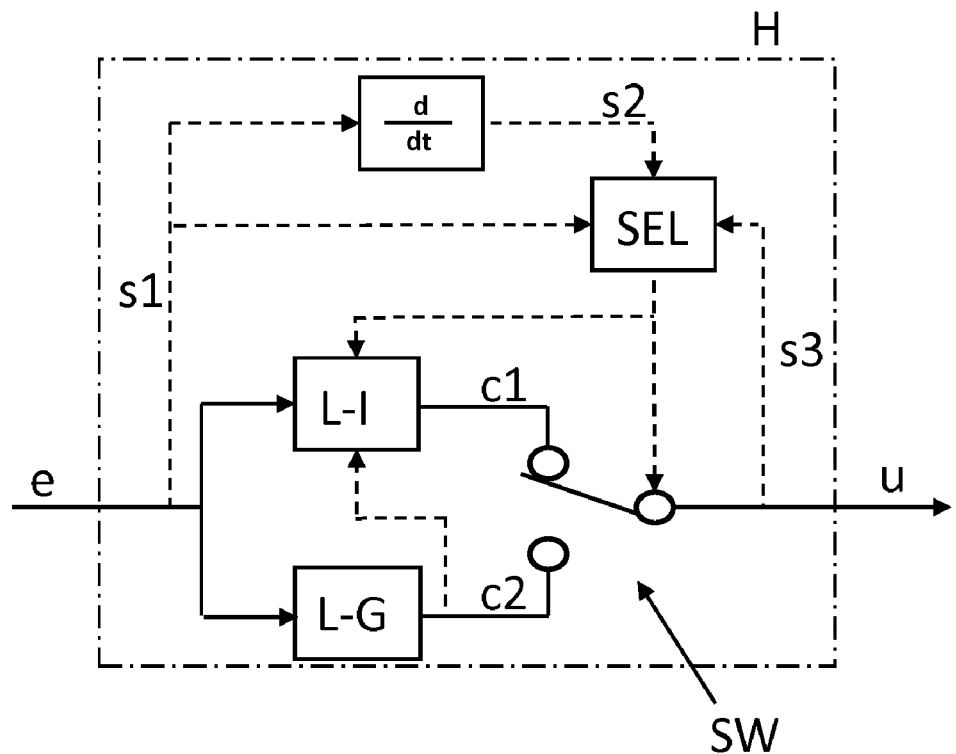
FIG. 3 shows the hybrid integrator-gain controller of FIG. 2 in more detail.

FIG. 3 shows the controller H in more detail. The linear integrator L-I and the linear gain L-G are arranged in parallel, and the error signal e is fed both into the linear integrator L-I and the linear gain L-G. On the basis of the error signal e, the linear integrator L-I may provide a first control signal c1 and the linear gain may provide a second control signal c2.

The selector SEL comprises a switch SW to select either the first control signal c1 as output signal or the second control signal c2 as output signal. When the switch SW is arranged to use the first control signal c1 as output signal u, as shown in FIG. 3, the first controller H is in integrator mode. When the switch SW is arranged to use the second control signal c2 as output signal u, the first controller H is in gain mode. It is remarked that the selector SEL including the switch SW will typically be realized as a number of software instructions in a processing unit, for example a central processing unit of a lithographic apparatus.

In a state space representation, the linear integrator L-I may be described as:

$$\dot{x}_h = \omega_h e,$$

wherein $\dot{x}_h$ is the first derivative of the state $x_h$ of the linear integrator, $\omega_h$ is the integrator frequency and e is the error signal used as input signal of the controller, and $$c1 = x_h.$$

Similarly, the linear gain L-G may be described as:

$$x_h = k_h e,$$

wherein $x_h$ is the state of the linear gain L-G, $k_h$ is the gain and e is the error signal used as input signal of the controller, and $$c2 = x_h.$$

The selector SEL is arranged to switch to integrator mode, i.e. select the first control signal c1 as output signal of the controller, or to the gain mode, i.e. select the second control signal c2 as the output signal u of the controller, in dependence of the values of the output signal u, the input signal e, and the first derivative $\dot{e}$ of the input signal e.

In particular, the selector SEL is arranged to switch to the integrator mode, when the value of the second control signal c2 passes zero. The value of the second control signal c2 may pass zero when the value changes from a negative value to a positive value or when the value changes from a positive value to a negative value.

Further, the selector SEL is arranged to switch to the second control signal c2 as the output signal u, i.e. from the integrator mode to the gain mode, when the following switching condition is fulfilled:

$$eu < k_h^{-1} u^2,$$

wherein e is the error signal used as input signal of the controller, u is the output signal of the controller, $k_h$ is the gain of the linear gain L-G, and $k_h^{-1}$ is $1/k_h$. The output signal u may be the output signal of the controller when the controller is in the integrator mode. Since in integrator mode the output signal u equals the first control signal c1, and the second control signal c2 always equals $k_h e$, the switching condition may also be written as:

$$|k_h e| < |u| \Rightarrow$$

$$|c2| < |c1|,$$

with the additional requirement that e and u have the same sign.

In other words, the selector SEL is arranged to switch to the second control signal c2 as the output signal u, when an absolute value of the first control signal c1 is larger than an absolute value of the second control signal c2. The selector SEL is arranged to switch to the gain mode when an absolute value of the first control signal c1 is larger than an absolute value of the second control signal c2. The input signal e and the output signal u may have the same sign, i.e., the input signal e and the output signal u may both be positive or may both by negative.

It is remarked that when the first control signal c1 and the second control signal c2 are the same, the selector SEL may switch from the integrator mode to the gain mode, or may remain in the integrator mode.

Furthermore, the selector SEL is arranged to switch back to the integrator mode when the following switching condition is fulfilled:

$$\omega_h e^2 \le k_h \dot{e} e,$$

wherein $\omega_h$ is the integration frequency of the linear integrator, e is the input signal, $k_h$ is the gain of the linear gain, and $\dot{e}$ is the first derivative of the input signal e.

To enable the selector SEL to determine whether the controller should be arranged in integrator mode or gain mode, the error signal e is fed as selector signal s1 to the selector SEL. Furthermore, the first derivative of the first selector signal s1 is provided to the selector SEL as a second selector signal s2. Thus, the second selector signal s2 represents the first derivative of the error signal e.

The output signal u of the controller is also fed into the selector SEL as selector signal s3. Dependent on whether the selector SEL is in integrator mode or gain mode, the selector signal s3 is equal to the first control signal c1 or the second control signal s2, respectively.

It is remarked that when the error signal e is multiplied with the gain $k_h$, the resulting signal is equal to the second control signal c2. Thus, $k_h e = k_h s1 = c2$.

When the controller is in gain mode, the second control signal c2 is substantially continuously fed into the linear integrator L-I to provide an actual value of the second control signal c2 to the linear integrator L-I. This actual value of the second control signal c2 is used by the linear integrator L-I as a starting value for the linear integrator, when the selector SEL switches from the second control signal c2, i.e. gain mode, to the first control signal c1, i.e. integrator mode, as the output signal. This ensures that no discontinuities are present in the output signal u when the selector SEL switches from gain mode to integrator mode. Similarly, when the selector SEL switches from integrator mode to gain mode, the value of the first control signal c1 and the second control signal c2 are substantially the same. This results in an output signal u without any substantial discontinuities. It is remarked that although the output signal u does not comprise any discontinuities, there may be discontinuities in the first derivative of the output signal u.

This controller structure comprising a hybrid integrator-gain controller H, may be referred to as hybrid integrator-gain control system (HIGS).

The HIGS system may generally be described as $$\mathcal{H} := \begin{cases} \dot{x}_h = \omega_h e, & \text{when } (e, u, \dot{e}) \in \mathcal{F}_1 \\ x_h = k_h e, & \text{when } (e, u, \dot{e}) \in \mathcal{F}_2 \\ u = x_h, \end{cases}$$

with the sub-domains $$\mathcal{F}_1 := \left\{(e, u, \dot{e}) \in \mathbb{R}^3 \middle| eu \geq \frac{1}{k_h}u^2 \bigwedge (e, u, \dot{e}) \notin \mathcal{F}_2\right\}$$

$$\mathcal{F}_2 := \{(e, u, \dot{e}) \in \mathbb{R}^3 | u = k_h e \bigwedge \omega_h e^2 > k_h \dot{e} e\}.$$

wherein $\dot{x}_h$ is the first derivative of the state $x_h$ of the linear integrator, $\omega_h$ is the integrator frequency, and e is the error signal used as input signal of the controller, $k_h$ is the gain and u is the output signal of the controller.

Figure 4:
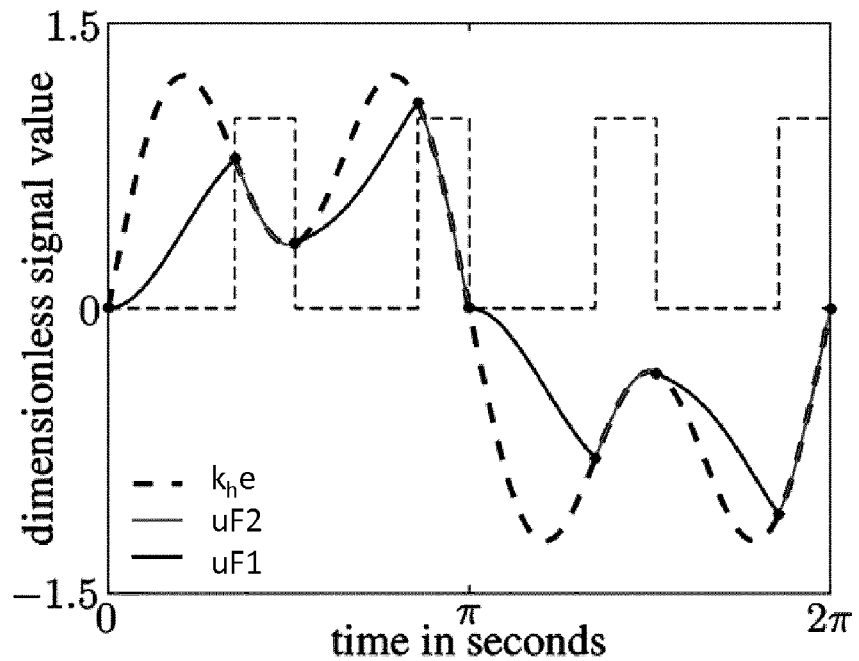
FIG. 4 shows a diagram with a relation between input signal and the output signal of the controller of FIG. 3.

FIG. 4 shows an example of a time series response of the behavior of the output signal u of the first controller H. The input signal e is given by $e(t)=\sin(2\pi t)+0.5 \sin(6\pi t)$ and the parameters of the first controller are set to $\omega h=1$ rad/s and $k_h=1.5$, wherein $\omega h$ is the integrator frequency and $k_h$ is the gain of the linear gain L-G. FIG. 4 shows the signal $k_h e$ being the input signal e multiplied by gain $k_h$. It is remarked that this signal $k_h e$ corresponds to the first control signal c1.

Initially, the first controller H is in integrator mode. In this integrator mode the first control signal c1 of the linear integrator L-I is used as the output signal u of the first controller H, shown in FIG. 4 as output uF1.

The first controller H remains in the integrator mode as long as the switching condition $$eu < k_h^{-1} u^2$$

is not fulfilled. Alternatively worded, as long as the absolute value of the first control signal c1 is smaller than an absolute value of the second control signal c2, the first controller H will remain in integrator mode. It is remarked that, in the embodiment shown in FIG. 3, the selector SEL may compare output signal u, being in integrator mode the same as the first control signal c1, with first selector signal s1 multiplied by gain $k_h$, representing the second control signal c2.

As soon as the absolute value of the first control signal c1 is larger than the absolute value of the second control signal c2, the switching condition $eu < k_h^{-1}u^2$ is fulfilled and the selector SEL will switch from integrator mode, using the first control signal c1 of the linear integrator L-I as the output signal u, to gain mode, using the second control signal c2 of the linear gain L-G as the output signal u. This output signal u is indicated in FIG. 4 as output uF2.

In the gain mode, the output signal u will be the same as the input signal e multiplied by gain $k_h$, i.e. output signal $u=k_h e$, as can be seen in FIG. 4.

The first controller H will remain in gain mode as long as the second control signal c2 does not pass zero or the switching condition $\omega_h e^2 \leq k_h \dot{e} e$ is not fulfilled.

In FIG. 4, the first derivative of the second control signal c2 passes zero at time ½π. At this point the signal $k_h e$ changes from decreasing to increasing in value. This means that the condition $\omega_h e^2 \leq k_h \dot{e} e$ is fulfilled and, as a result, the selector SEL will switch at this point from the gain mode to the integrator mode.

It is remarked that in the shown example of a sinusoidal error signal, the switching condition $\omega_h e^2 \leq k_h \dot{e} e$ is fulfilled when the first derivative of the second control signal c2 passes zero.

The first controller H is arranged to use the actual value of the second control signal c2, being equal to the output signal u in gain mode, at time ½π as a starting value of the linear integrator. This has the advantage that there is no discontinuity in the value of the output signal u of the first controller H. The actual value is available since the first controller H will, when in gain mode, substantially continuously feed the actual value of the second control signal c2, i.e. the output signal u, to the linear integrator L-I. Again the first controller H remains in integrator mode as long as the switching condition $eu < k_h^{-1}u^2$ is not fulfilled, shown by a second part of output uF1.

It can be seen in FIG. 4 that when the absolute value of the first control signal c1 becomes larger than the absolute value of the second control signal c2, the selector SEL switches from using the first control signal c1 of the linear integrator L-I as the output signal u to using the second control signal c2 of the linear gain L-G as the output signal u.

Now again the output signal u will be the same as the second control signal c2 as long as the second control signal c2 does not pass zero or the switching condition $\omega_h e^2 \leq k_h \dot{e} e$ is not fulfilled. At time π the second control signal c2 passes zero. As a result, the first controller H will switch at time π back from gain mode to integrator mode, using the actual value of the second control signal c2, being zero, as starting value for the linear integrator L-I.

As can be seen in FIG. 4, the first controller H will continue to switch from the integrator mode to the gain mode as soon as the absolute value of the first control signal c1 becomes larger than the absolute value of the second control signal c2. Also, the first controller H will continue to switch from the gain mode to the integrator mode as soon as the second control signal c2 passes zero or the first derivative of the second control signal c2 passes zero, i.e. the switching condition $\omega_h e^2 \leq k_h \dot{e} e$ is fulfilled.

It is remarked that an advantage of the switching between the integrator mode and the gain mode is that the sign of the output signal u will always be the same as the sign of the input signal e, while at the same time ensuring a continuous output signal u.

It has been found that these characteristics of the output signal u of the first controller H, based on the switching between the integrator mode and the gain mode, have a positive effect on the control performance of the control system in FIG. 1. In particular the 90 degrees phase lag typically present in linear integrators may be substantially reduced by the structure of the first controller H.

This can be clearly seen when using as error signal e:

$$e(\tau) = \hat{e} \sin(\tau),$$

for which it holds that $$u(\tau) = \begin{cases} \frac{\omega_h}{\omega}\hat{e}(1-\cos(\tau)) & \text{if } 0 \leq \tau < \gamma \\ k_h \hat{e}\sin(\tau) & \text{if } \gamma \leq \tau < \pi \\ \frac{\omega_h}{\omega}\hat{e}(1-\cos(\tau)) & \text{if } \pi \leq \tau < \pi+\gamma \\ k_h \hat{e}\sin(\tau) & \text{if } \pi+\gamma \leq \tau < 2\pi \end{cases},$$

where gamma represents the moment of switching defined as:

$$\gamma = 2\arctan\left(\frac{\omega k_h}{\omega_h}\right).$$

The describing function $D(\omega)$, or frequency response between $e(\omega)$ and $u(\omega)$ of the first controller H is then given by $$\mathcal{D}(\omega) = \frac{u(\omega)}{e(\omega)} = \frac{a_1 + b_1 j}{\hat{e}}, \text{ with}$$

$$a_1 = \frac{\hat{e}}{\pi}\left\{\frac{\omega_h}{2\omega}(\cos(2\gamma) - 4\cos(\gamma) + 3) + k_h\left((\pi - \gamma) + \frac{1}{2}\sin(2\gamma)\right)\right\}$$

$$b_1 = \frac{\hat{e}}{\pi}\left\{\frac{\omega_h}{2\omega}(4\sin(\gamma) - \sin(2\gamma) - 2\gamma) - \frac{k_h}{2}(1 - \cos(2\gamma))\right\}.$$

Interestingly, $$\mathcal{D}(\omega) := \frac{\omega_h}{\omega}\left\{1 + \frac{4j}{\pi}\right\} \text{ as } \gamma \to \pi.$$

This is the frequency response function of a standard linear integrator with 20 dB per decade amplitude decay, but with a phase lag of only 38.15 degrees. For other values of $\omega_h$ and $k_h$ different properties may be obtained, but always with less phase lag than 38.15 degrees. The first controller H is therefore very suitable as an alternative/replacement to existing linear integrators with the aim to use the above described phase benefits. These phase benefits may advantageously be used to increase the bandwidth of a control system, or more generally to improve the performance of the control system.

Figure 5:
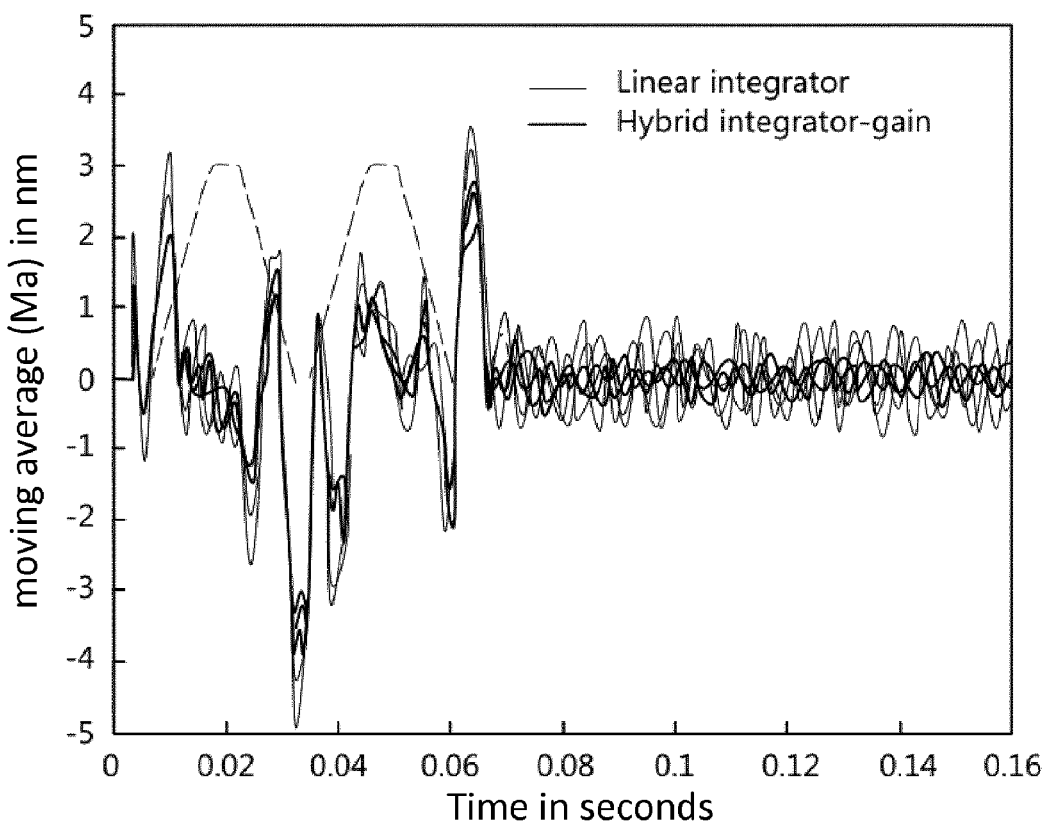
FIG. 5 shows a time-domain response of the moving average Ma of a linear integrator controller and a hybrid integrator-gain controller.
Figure 6:
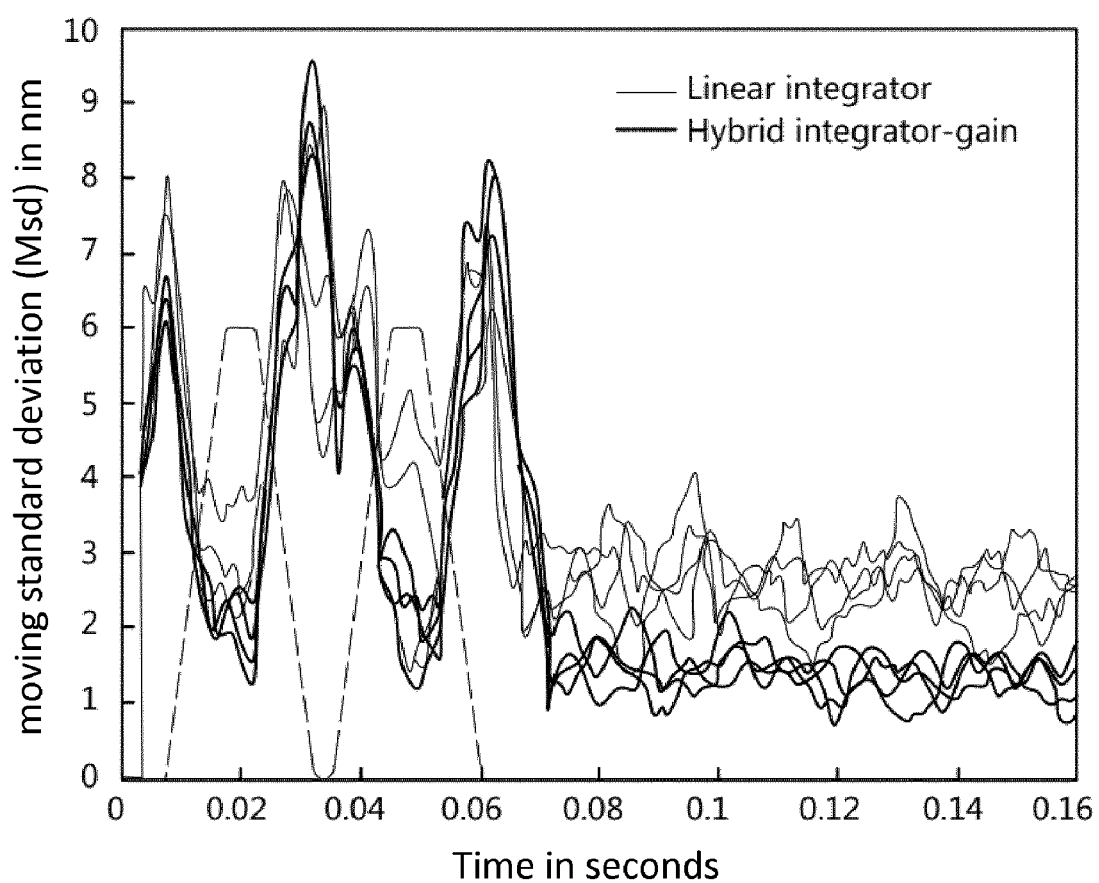
FIG. 6 shows a time-domain response of the moving standard deviation Msd of a linear integrator controller and a hybrid integrator-gain controller.

FIGS. 5 and 6 show, as an example of the improved performance of the control, two time-domain responses of two performance indicators: the moving average Ma (FIG. 5) and moving standard deviation Msd (FIG. 6). In each of the figures the time response of a linear integrator controller and the time response of a hybrid integrator-gain controller are shown. It can be seen that the performance in disturbance rejection is substantially improved in the control system having the hybrid integrator-gain controller with respect to the control system having the linear integrator controller.

Hereinabove, the use of a hybrid integrator-gain control system has been described in a control system comprising a hybrid integrator-gain controller and a second nominal controller. This control system forms a non-linear PI²D, or possibly PI³D control system in which one of the integrators is replaced by a hybrid integrator-gain controller. The hybrid integrator-gain controller may also be applied in other control systems, for instance to form a low pass filter or a notch filter, in which one of the integrators in the low pass or notch is replaced by a hybrid integrator-gain controller.

More generally, the hybrid integrator-gain controller may be used in any suitable control system. In particular the hybrid integrator-gain controller may be used to replace a conventional linear integrator to reduce phase lag. This reduction in phase lag may have a positive effect on the bandwidth of the control system.

Hereinabove, a feedback system is described. In practice, the control system having a feedback loop may be combined with other control features, such as a feedforward loop.

Although specific reference may be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, liquid-crystal displays (LCDs), thin-film magnetic heads, etc. The skilled artisan will appreciate that, in the context of such alternative applications, any use of the terms "wafer" or "die" herein may be considered as synonymous with the more general terms "substrate" or "target portion", respectively. The substrate referred to herein may be processed, before or after exposure, in for example a track (a tool that typically applies a layer of resist to a substrate and develops the exposed resist), a metrology tool and/or an inspection tool. Where applicable, the disclosure herein may be applied to such and other substrate processing tools. Further, the substrate may be processed more than once, for example in order to create a multi-layer IC, so that the term substrate used herein may also refer to a substrate that already contains multiple processed layers.

Although specific reference may have been made above to the use of embodiments of the invention in the context of optical lithography, it will be appreciated that the invention may be used in other applications, for example imprint lithography, and where the context allows, is not limited to optical lithography. In imprint lithography a topography in a patterning device defines the pattern created on a substrate. The topography of the patterning device may be pressed into a layer of resist supplied to the substrate whereupon the resist is cured by applying electromagnetic radiation, heat, pressure or a combination thereof. The patterning device is moved out of the resist leaving a pattern in it after the resist is cured.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

The descriptions above are intended to be illustrative, not limiting. Thus, it will be apparent to one skilled in the art that modifications may be made to the invention as described without departing from the scope of the claims set out below.

The invention claimed is:

1. A control system, comprising:
a controller arranged to provide an output signal on the basis of an input signal, the controller comprising:
a linear integrator arranged to provide a first control signal;
a linear gain in parallel to the linear integrator and arranged to provide a second control signal; and
a selector arranged to switch between an integrator mode in which the first control signal is used as the output signal of the controller and a gain mode in which the second control signal is used as the output signal of the controller, wherein the selector is arranged to:
switch to the integrator mode when the value of the second control signal passes zero; and
switch to the gain mode when:

$$eu < k_h^{-1} u^2,$$

wherein e is the input signal of the controller, u is the output signal of the controller, and $k_h$ is the gain of the linear gain, and
wherein the output signal of the controller controls a position or speed variable of one or more of:
a stage,
a lens,
a handler,
a stage position system, or
a radiation source system.

2. The control system of claim 1, wherein the selector is further arranged to switch to the integrator mode when:

$$\omega_h e^2 \leq k_h \dot{e} e,$$

wherein $\omega_h$ is the integration frequency of the linear integrator, e is the input signal, $k_h$ is the gain of the linear gain, and ė is the first derivative of the input signal.

3. The control system of claim 1, wherein the selector is arranged to switch to the gain mode when an absolute value of the first control signal is larger than an absolute value of the second control signal.

4. The control system of claim 1, wherein the controller is arranged to switch between the gain mode and the integrator mode, when the value of the first control signal and the value of the second control signal are the same at the moment of switching.

5. A method to increase a bandwidth of a control system providing an output signal on the basis of an input signal, the control system comprising a linear integrator and a linear gain parallel to the linear integrator, wherein the linear integrator is arranged to provide a first control signal and wherein the linear gain is arranged to provide a second control signal, the method comprising:
switching to an integrator mode when the value of the second control signal passes zero; and
switching to the gain mode when:

$$eu < k_h^{-1} u^2,$$

wherein e is the input signal of the controller, u is the output signal of the controller in the integrator mode, and $k_h$ is a gain of the linear gain,
wherein in the integrator mode the first control signal is used as the output signal, and
wherein in the gain mode the second control signal is used as the output signal, and
wherein the output signal of the controller controls a position or speed variable of one or more of:
a stage,
a lens,
a handler,
a stage position system, or
a radiation source system.

6. The method of claim 5, wherein the method comprises:
switching to the integrator mode when:

$$\omega_h e^2 \leq k_h \dot{e} e,$$

wherein w$\omega_h$ is an integration frequency of the linear integrator, e is the input signal, $k_h$ is the gain of the linear gain, and ė is a first derivative of the input signal.

7. The method of claim 5, wherein the method comprises:
using an actual value of the second control signal as a starting value of the linear integrator, when switching to the integrator mode.

8. A lithographic apparatus comprising:
a support constructed to support a patterning device, the patterning device being capable of imparting a radiation beam with a pattern in its cross-section to form a patterned radiation beam;
a substrate table constructed to hold a substrate; and
a projection system configured to project the patterned radiation beam onto a target portion of the substrate,
wherein the lithographic apparatus comprises a control system to control a variable of the lithographic apparatus, the control system comprising:
a controller arranged to provide an output signal on the basis of an input signal, the controller comprising:
a linear integrator arranged to provide a first control signal;
a linear gain in parallel to the linear integrator and arranged to provide a second control signal; and
a selector arranged to switch between an integrator mode in which the first control signal is used as the output signal of the controller and a gain mode in which the second control signal is used as the output signal of the controller,
wherein the selector is arranged to:
switch to the integrator mode when the value of the second control signal passes zero; and
switch to the gain mode when:

$$eu < k_h^{-1} u^2,$$

wherein e is the input signal of the controller, u is the output signal of the controller, and $k_h$ is the gain of the linear gain, and
wherein the output signal of the controller controls a position or speed variable of one or more of:
a stage of the lithographic apparatus,
a lens of the lithographic apparatus,
a substrate handler,
the substrate table;
a stage position system, or
a radiation source system.

9. A control system, comprising:
a controller arranged to provide an output signal on the basis of an input signal, the controller comprising:
a linear integrator arranged to provide a first control signal;
a linear gain in parallel to the linear integrator and arranged to provide a second control signal; and
a selector arranged to select the first control signal or the second control signal as the output signal of the controller,
wherein the selector is arranged to:
switch to the first control signal as the output signal when the value of the second control signal passes zero; and
switch to the second control signal as the output signal when an absolute value of the first control signal is the same or larger than an absolute value of the second control signal, and
wherein the output signal of the controller controls a position or speed variable of one or more of:
a stage,
a lens,
a handler,
a stage position system, or
a radiation source system.

10. The control system of claim 9, wherein the selector is further arranged to switch to the first control signal as the output signal when a value of the first derivative of the second control signal passes zero.

11. The control system of claim 9, wherein the selector is arranged to select the first control signal as the output signal when the absolute value of the first control signal is smaller than the absolute value of the second control signal.

12. The control system of claim 9, wherein the controller is arranged to use an actual value of the second control signal as a starting value of the linear integrator when the selector is switched from the second control signal to the first control signal as the output signal.

13. The control system of claim 12, wherein the controller is arranged to provide continuously the actual value of the second control signal to the linear integrator.

14. A method to increase a bandwidth of a controller providing an output signal on the basis of an input signal, the controller comprising a linear integrator and a linear gain parallel to the linear integrator, wherein the linear integrator is arranged to provide a first control signal, and wherein the linear gain is arranged to provide a second control signal, the method comprising:
- selecting the first control signal as the output signal of the controller when the value of the second control signal passes zero; and
- switching to the second control signal as the output signal of the controller when an absolute value of the first control signal is the same or larger than an absolute value of the second control signal, and
- wherein the output signal of the controller controls a position or speed variable of one or more of:
- a stage,
- a lens,
- a handler,
- a stage position system, or
- a radiation source system.

15. The method of claim 14, wherein the method comprises:
- switching to the first control signal as the output signal when a value of the first derivative of the second control signal passes zero.

* * * * *